United States Patent [19]
Whitaker

[11] 3,778,771
[45] Dec. 11, 1973

[54] REMOTE METER READING APPARATUS

[76] Inventor: William T. Whitaker, 2115 Chestnut St., Wilmington, N.C. 28401

[22] Filed: Nov. 22, 1971

[21] Appl. No.: 200,792

[52] U.S. Cl. .............................. 340/150, 340/324 R
[51] Int. Cl. .............................................. H04q 9/00
[58] Field of Search ................. 179/2 A; 340/324 R, 340/150, 151

[56] References Cited

UNITED STATES PATENTS

| | | | |
|---|---|---|---|
| 3,553,376 | 1/1971 | Bogaart | 179/2 A |
| 3,647,971 | 3/1972 | Cushman et al. | 179/2 A |
| 3,376,452 | 4/1968 | Lally | 340/324 R |
| 3,548,403 | 12/1970 | Johnson | 340/324 R |
| 3,414,676 | 12/1968 | Long | 179/2 A |
| 3,274,584 | 9/1966 | Morgan et al. | 179/2 A |

*Primary Examiner*—Donald J. Yusko
*Assistant Examiner*—Marshall M. Curtis
*Attorney*—John G. Mills, III

[57] ABSTRACT

At a central utility company station, a customer's telephone number is dialed either manually or automatically, whereupon a first or starting audio frequency tone is impressed upon the telephone trunk line which activates the meter reading apparatus at the subscriber's end. Upon receipt of the starting tone frequency, a starting circuit activates a plurality of fixed frequency oscillators, which in turn are connected to a specially adapted dial face of the utility meter to electrically impart a distinctive frequency tone to each number position. The circuit is completed by means of a tone pickup arm attached each dial which transmits the frequency to the corresponding contact of a stepping switch. A second pulsing circuit receive a second or pulsing tone of differing frequency from the central station to sequentially connect the wiper of the stepping switch with the electrical path from each of the meter dials, so that each dial may be read. The tone frequency corresponding to the number position of each meter dial is transmitted back to a tone converter at the central station, which converts the frequencies into electrical information which is intelligible to a billing and information storing computer. The system may be adapted to operate several types of meters at a customer location, or by using certain commercially available stepping switches to read many meters of a certain type at such locations as apartments and office buildings.

4 Claims, 8 Drawing Figures

INVENTOR
WILLIAM T. WHITAKER

BY Hunt, Rhodes & Neill
ATTORNEY

INVENTOR
WILLIAM T. WHITAKER

BY Hunt, Rhodes & Mills
ATTORNEY

INVENTOR
WILLIAM T. WHITAKER

BY Hunt, Rhodes & Mill
ATTORNEY

INVENTOR
WILLIAM T. WHITAKER

BY Hunt, Rhodes & Mills
ATTORNEY

REMOTE METER READING APPARATUS

BACKGROUND OF THE INVENTION

In recent years, substantial work has been done in an effort to develop utility meter reading systems whereby public utility companies may save the expense and trouble of using employees to visit and visually read meters at each subscriber location. In such systems, data accumulated at the meter is transmitted over telephone line by electric pulses or some similar manner. The previous attempts, although conceivably workable, necessitate complicated and expensive equipment, and do not appear to be commercially feasible.

It is, therefore, generally an object of the present invention to provide an improved, simplified, and less expensive system which utilizes existing telephone lines to automatically read utility meters located at remote locations from a central station.

Another object of the invention is to provide a system of the type described wherein present utility meters may be utilized with minor changes to the dial face only, and the addition of a relatively small control apparatus between each meter and the telephone line at the remote locations.

A further object of the invention is to provide a system of the type described including a tone generating mechanism at each utility meter which imparts a different frequency tone to a contact adjacent each number position of each dial, tone pickup means connected to the dial arm connecting the frequency tone corresponding to the number position of each dial as it is monitored into the telephone line, and a switching means for examining each dial of the meter in turn.

Yet another object of the present invention is to provide a system of the type described further including a tone generating meter at the central station whereby the utility meter is interrogated by a series of frequency tones.

A still further object of the present invention is to provide a system of the type described, further including a tone converting apparatus at the central station for converting the frequency tones received from the meter into computer language for accounting and billing information.

The foregoing objects of the invention, and other objects will become apparent as the description proceeds and with reference to the drawings, wherein:

FIGS. 1A and B are an electrical schematic view showing the meter reading system in general;

Figure 1A:
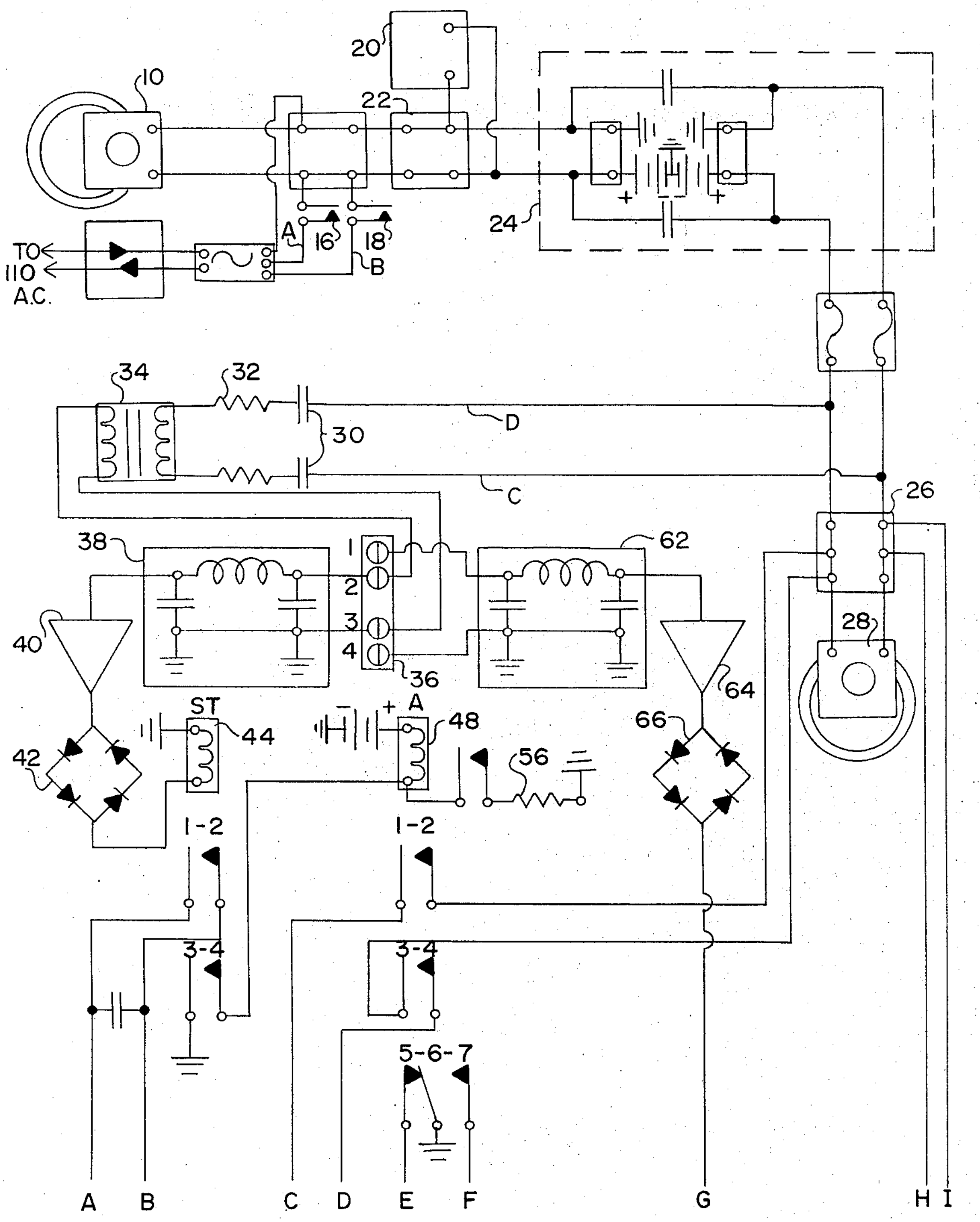
Figure 1B:
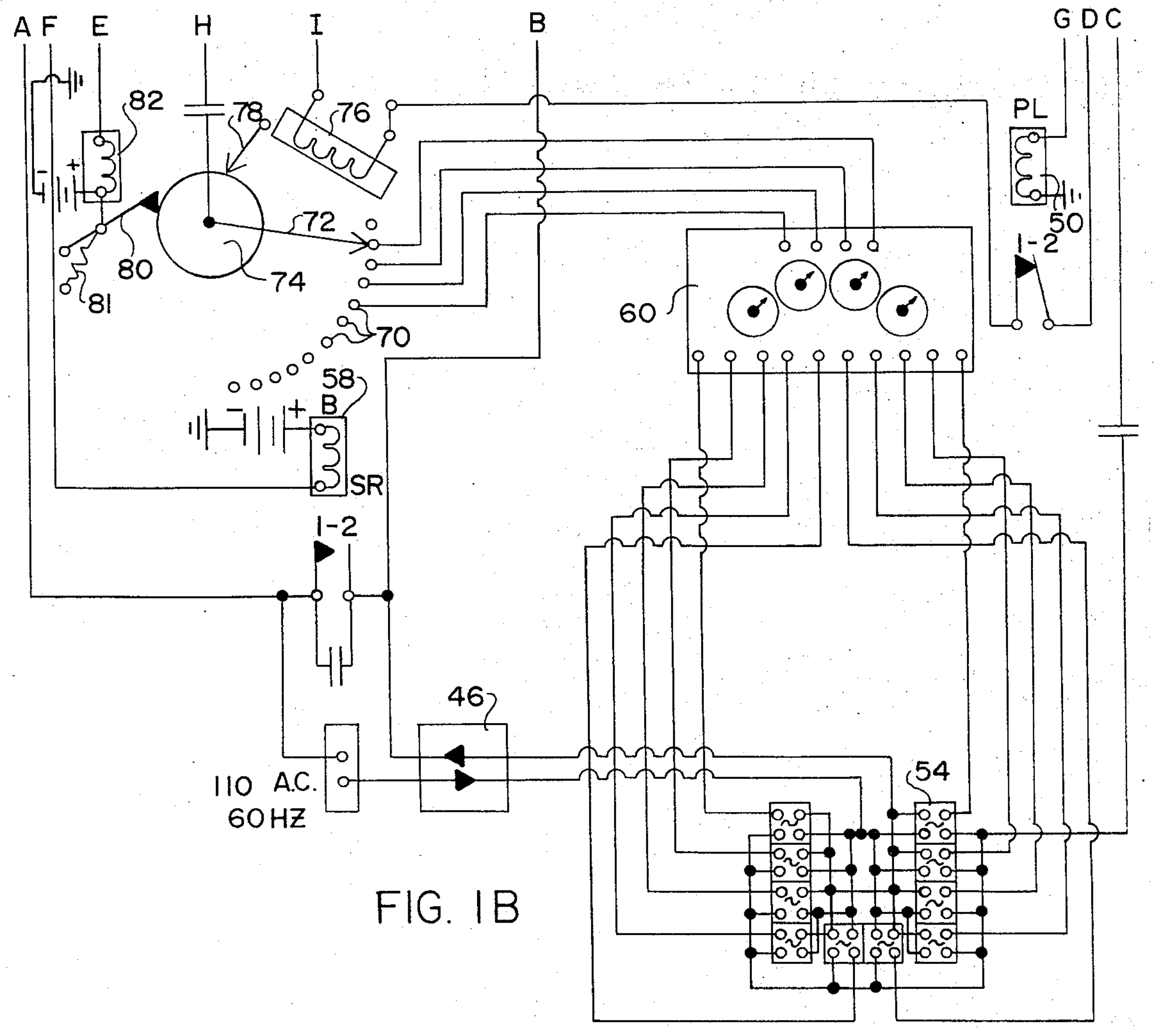

Referring now to FIG. 1 of the drawings, there is illustrated the entire system, the most important part of the invention being the remote information transmitting, receiving and switching equipment unit which includes a fixed frequency oscillator, a stepping switch, and a specially adapted meter. The system may be used with or without automatic dialing equipment. A multifrequency tone generator means at the central station impresses a prescribed frequency tone signal onto the telephone line, which is transmitted to the telephone central office and on to a customer's phone to initiate the remote information transmitting receiving and switching equipment through a starting circuit. Once the equipment is connected to the circuit, a second tone generating means electrically imparts to the dials of the specially adapted meter a separate and distinct signal for each number position of the dials. A tone pickup means or wiper on each dial connects a frequency tone from the number position corresponding to the dial reading to the bank terminals of a rotary stepping switch. The multifrequency generator is then shifted to a different frequency and frequencies from the generator operate the stepping switch through a pulsing circuit to successively connect each dial into the telephone line. Although for purposes of illustrating the invention the meter being read is an electric meter, it should be understood that the system may be used equally as effectively with a gas meter, water meter, or any other meter for measuring the amount of utility service used by a particular customer, and may be used to read more than one type of meter for any particular customer.

The equipment in the utility company's central station comprises a conventional telephone instrument 10, which may be operated either manually or by automatic dialing equipment. A multi-frequency tone generator oscillator 12 is connected to a power source by means of a rectifier 14 to provide a DC current. Oscillator 12 is adapted to impress an audible frequency tone onto the telephone trunk line through either line *a* or line *b* by means of one of switches 16, 18 for reasons to be hereinafter described. An information storage and billing computer 20 is adapted to receive information back from the customer over the telephone line through a tone converter 22 which receives audible tone frequencies and converts them to computer language for use by computer 20.

The telephone company central office 24 is conventional and forms no part of the present invention, and is merely mentioned because the information must be transmitted through the switching equipment at the telephone office in a conventional, well known manner to those skilled in the art.

From the telephone office, the telephone lines extend to a connecting block 26 at a remote subscriber location. The equipment to be described from this point on in the specification is provided at each subscriber's location. The subscriber's telephone set 28 is connected to two of the terminals of connecting block 26, while a pair of leads *c*, *d* lead from two other terminals of the connecting block 26, each line *c*, *d* including a coupling capacitor 30 and a coupling resistor 32, before terminating at opposite ends of the primary winding of a transformer 34.

A conductor path e extends from one end of the secondary winding of transformer 34 to terminal 2 on terminal block 36, while a second path *f* extends from the other end of the secondary winding to terminal 3 on terminal block 36, terminals 1 and 2 being connected and terminals 3 and 4 being connected. From here the circuit splits into a start circuit through terminals 2 and 3 and a pulsing circuit through terminals 1 and 4, each of which will be hereinafter described.

In the start circuit, conductors *e* and *f* continue through the terminal block 36 through a 2,000 Hz. filter 38, continuing through an amplifier 40, a full wave rectifier 42, and into the coil of a start relay 44.

Start relay 44 divides the current into two circuits, one of which travels to connect a 110 v. AC power supply into a rectifier 46, while the other circuit provides an electrical path to a nine contact switching relay 48. One set of contacts 3–4 of relay 48 provides an electrical path through the contacts of a pulsing relay 50 into a step switch 52, the details of which will be described hereinafter. Another set of contacts 1–2 provide an electrical path between the telephone line and a fixed frequency tone generating unit 54 to be hereinafter described in detail. A third set of contacts 8–9 of switching relay 48 provide an electrical path through a thermal timing contactor 56, which automatically opens 30 to 60 seconds after the initiation of the circuit by the starting pulse to disconnect the apparatus from the telephone system.

Figure 4:
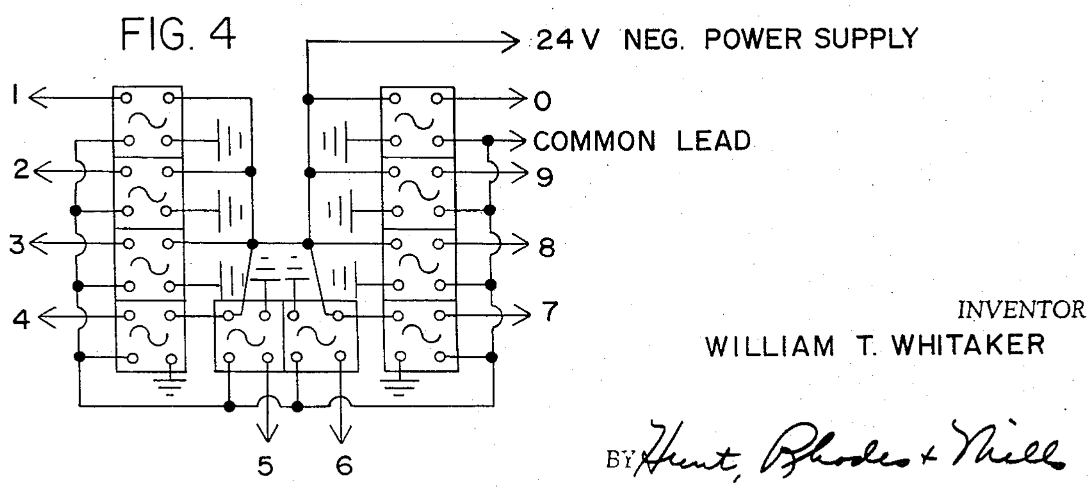
FIG. 4 is an enlarged diagrammatic view of the fixed frequency tone generating unit showing the electrical connections thereto.

A slow release relay 58 is energized by the closing of contacts 6–7 of relay 48 to connect the 110 v. AC power source and rectifier 46 to retain the system in its energized condition after the attendant at the utility company central station has released the start key 16. The fixed frequency tone generating package 54 (FIG. 4) comprises 10 solid state, fixed frequency oscillators packaged together and electrically connected as illustrated in FIG. 4. Each oscillator generates a different frequency tone which is connected with a contact point on each dial which corresponds with one of the number positions on the dial. Such fixed frequency oscillator packages are well known in the telephone industry and are used there to generate different frequencies equivalent to the Bell System touch tone numbers 1–0 (697 Hz. - 1,633 Hz.). The 10 fixed frequency oscillators are connected to a power source through a common line from rectifier 46 and have a common ground. Also they are all connected by one common lead into the telephone line through contacts 1–2 of switching relay 48.

The second or pulsing circuit commences at terminals 1 and 4 of terminal block 36 and passes through a 2,200 Hz. filter 62, amplifier 64, full-wave rectifier 66 where it is transformed into a DC current and passes into the coil of pulsing relay 50 for the operation thereof as explained hereinbelow.

Utility Meter Dial Modification

Figure 2:
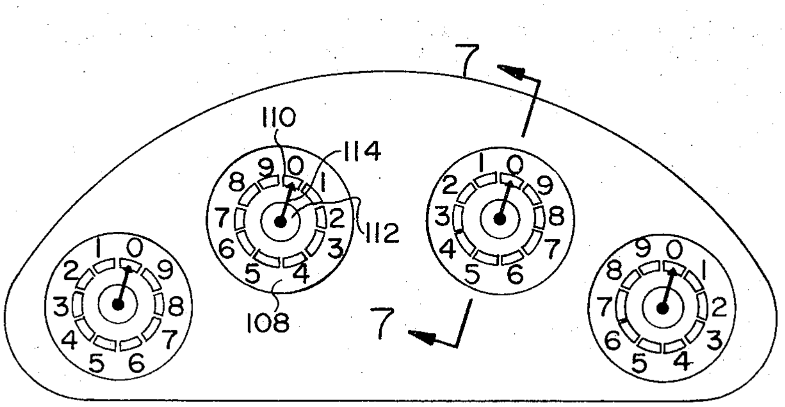
FIG. 2 is a diagrammatic view showing the layout of a meter face adaptd for use with the present invention.
Figure 3:
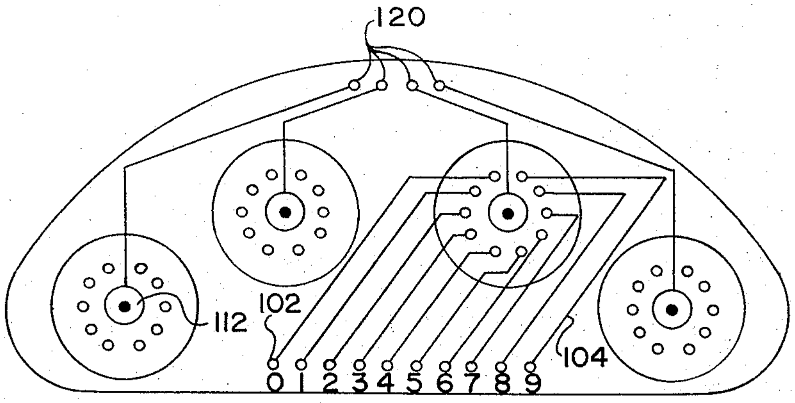
FIG. 3 is a view similar to FIG. 2, except showing the reverse side of the meter face.

Turning now to FIGS. 2 and 3, there are illustrated the changes in the meter face 60 necessary to adapt the meter to be utilized with the present invention. The dial face 100 should be molded of plastic, phenolic, fiberglass or other non-conductive material with a set of 10 terminals 102 on one side (preferably the reverse side) thereof for receiving the tone signals from the fixed frequency tone generator unit 54. A circuit 104 is printed into the meter face by conventional means to connect each of the terminals with one of the meter dials, each terminal being connected to a different number position. The number positions are then bridged over to the corresponding number position of the adjacent dials by printed circuits (not shown) to impress upon these number positions the desired and prescribed frequency tones. On the front side of the dials in addition to the normal clock face type dials 108, an arcuate brass segment 110 is molded into and raised slightly from the face of the meter face adjacent each of the number positions. The arcuate brass contacts or segments 110 are elongated with only approximately a 1/32 inch gap between each contact. A continuous 360° brass ring 112 is cast flush with or slightly raised from the face on a diameter slightly smaller than that of the segmented brass contacts.

Figure 7:
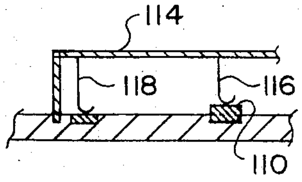
FIG. 7 is a sectional view taken substantially along lines 7—7 of FIG. 2, illustrating one of the tone pickup means for the utility meter.

The sweep arm 114 is made of a brass material, painted black on the top for ease of visual reading, and insulated from the main shaft leading to the gearing mechanism below. Arm 114 includes two trailing resilient wipers 116, 118 (FIG. 7) from the bottom thereof, so situated so that wiper 116 tracks the segmented brass contacts 110, while wiper 118 tracks along brass ring 112. Due to the spacing of contacts or segments 110 and the resilience of wiper 116, the outer wiper 116 will always be in contact with one of the brass contact segments.

The brass ring 112 from each dial is connected to one of four terminals 120, to which a conductor is connected leading from the meter to one contact of the rotary step switch 52.

So arranged the fixed frequency tone generator 54 will send ten distinct tones to each dial of the meter, one frequency tone corresponding to each of the number positions on the dial. As the specially adapted dial arms sweep the face of the dial, the outer wiper 116 will engage one of the brass segments 110 at all times and pick up the tone that corresponds to that particular number position. The tone will then travel along the dial arm 114 back to the inner wiper 118 and down to the brass ring 112, from whence it will be transmitted back to one of the contacts of the rotary step switch 52.

It should be noted that some power meters contain five dials, rather than four, however it would be obvious to add another dial face and another terminal to lead back to the rotary step switch 52. Further, typical liquid petroleum gas meters and water meters utilize drum type dials rather than clock face type dials, and it is within the scope of the present invention to so modify such dials as to impress upon each numeral of each dial a prescribed tone frequency and pick up the tone frequency corresponding to the dial setting.

Rotary Step Switch

Figure 5:
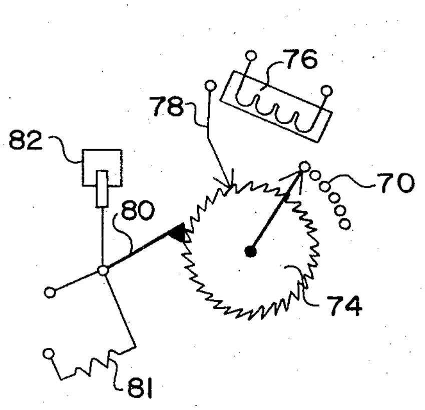
FIG. 5 is a diagrammatic view of the stepping switch and its electrical connections.

Rotary step switch 52, as illustrated in FIG. 5, comprises a plurality of contacts 70 arranged in an arcuate path about a central shaft and a rotary wiper 72 having one end connected to said shaft and the other end adapted to sequentially engage one of contacts 70 to connect one of the dials of meter 60 into the circuit. Such a construction is conventional in stepping switches. The shaft upon which wiper 72 is mounted also includes a gear 74 secured for rotation therewith. A coil spring, not shown, adjacent the bottom of gear 74 connects the gear to the shaft to normally bias it in a counterclockwise direction, while a pulse operated rotary relay 76 is responsive to pulse relay 50 to rotate gear 74 one step at a time in clockwise direction through a pawl 78 attached to the end of the armature rotary relay 76.

A locking pawl 80 engages the teeth of gear 74 to prevent inadvertent counterclockwise movement of the gear under the influence of the coil spring to a normal position out of engagement with any of the contacts 70. A locking spring 81 normally urges locking pawl 80 into engagement with the gear. A release solenoid 82 urges locking pawl 80 out of engagement with the gear teeth in response to the opening of thermal contactor 56, allowing the wiper arm 72 to return to its normal position upon completion of the meter reading.

It is apparent that other types of stepping switches or relays might be used in the present invention, and the description above is merely exemplary of one type of stepping switch which may be used with the invention.

Operation of the System

To initiate operation of the system, an attendant dials a customer's telephone number over the utility company's trunk line, or else automatic dialing equipment may be utilized. Upon ascertaining that he has dialed the correct number, if the manual operation is used, he directs the customer that his meter is about to be read and that he is to return his receiver to the hook. At this time the attendant operates the start key 16, which closes a contact between the electronic tone generator or multi-frequency oscillator 12 and the telephone trunk line, thus sending out a 2,000 Hz. frequency start tone over the trunk line through the telephone company switching network and to the customer's phone. At the customer's end of the line, the 2,000 Hz. signal is directed through wires *c, d* into the meter reading network at capacity coupling 30. The 2,000 Hz. signal is then passed through an isolation transformer 34 and onto terminal block 36. Since the tone frequency is 2,000 Hz., it will only be accepted by the 2,000 Hz. filter 38 from whence it passes into the starting circuit. The signal passes through single stage amplifier 40 where it is amplified sufficiently to operate the starting relay 44, after passing through a converting rectifier 42 which changes the 2,000 Hz. signal to a DC current which flows to the winding of the start relay 26. The DC current causes the coil to become energized and the relay armature closed, thus closing contacts 1 and 2 and contacts 3 and 4.

It should be noted here that in those cases where partly line operation is desired, a different signal should be used for each party on the line. For example, the 2,000 Hz. signal could be used for a private line or party 1 of a party line, an 1,800 Hz. signal could be used for party 2, 2,400 Hz. for party 3 and 2,550 Hz. for party 4, each specific signal serving as a start tone. In each of the circuits, party No. 1 would have a 2,000 Hz. filter, party No. 2 an 1,800 Hz. filter, etc.

The closing of contacts 1 and 2 of relay 44 completes an electrical path between a 110 v. AC power supply and the 24 v. DC rectifier 46, whereupon the whole meter reading system is energized by the 24 v. DC current. The closing of contacts 3 and 4 completes an electrical ground path to the switching relay 48.

Switching relay 48 is now charged with a 24 v. negative charge supplied from the power supply and a ground or positive charge from the operation of start relay 44. The switch relay 48 is energized and operates or closes contacts 8–9, setting up a locking ground to the coil of the switching relay 48 through a thermal contactor 56 which is grounded. This creates a 24 v. DC charge flowing through the thermal contactor 56, which is used as a timing device and will later heat to the point where it will open and release the entire circuit, thus shutting down the system after a time lapse of approximately 30 seconds, which is more than sufficient to complete the meter reading.

Contacts 1–2 close upon the energization of relay 48 and complete an electrical path from the common lead of the fixed frequency tone generator unit 54 to one side of the telephone line. Contacts 3–4 also close upon energization of relay 48 and complete an electrical path from the coil of the rotary stepping relay 76 by way of closed contacts 1–2 on pulsing relay 50 to the positive side of the telephone line. Contact 6 is moved away from contact 5 and engages contact 7 upon energization of relay 48.

The closing of contacts 6–7 on relay 48 energizes relay 58 by providing a ground path to the DC charged coil of relay 58, closing its contacts 1–2 which completes a secondary electrical path between the 110 v. AC supply and the 24 v. DC rectifier. This slow release relay 58 locks the system in the ON condition after the attendant at the utility company has released start key 16.

The power supply through rectifier 46 is now locked in the ON condition, the switching relay operatively locked into the circuit, the rotary stepping switch 52 connected in series with the 48 v. negative DC power from the telephone line through the closed contacts 3–4 of switching relay 48, and the ten individual fixed frequency oscillators in the package 54 are energized and emit distinctively different frequencies over the ten individual conductor paths to the meter 60 as the common lead from fixed tone generator unit 54 to the telephone line is closed through contact 1–2 of switch relay 48.

With the system energized, the attendant now operates the pulsing key 18, sending out a 2,200 Hz. pulsing signal or read tone which is rejected by the 2,000 Hz. filter unit 38, and passes through the secondary circuit containing a 2,200 Hz. filter 62. The 2,200 Hz. frequency passes through filter 62 and is transmitted through the single stage amplifier 64, through rectifier 66 which transforms the tone frequency to a DC current, and passes the current onto pulsing relay 50.

As the pulsing relay is energized, it interrupts the 48 v. DC current flowing from the telephone line through the rotary stepping switch 52, causing it to energize the rotary stepping relay coil 76. As a result the gear 74 is moved forward one notch, thus moving the brass wiper 72 into engagement with the first contact leading to the utility meter 60. In such a position, the wiper will conduct the tones corresponding to the numeral being displayed on the meter itself back through the telephone system to the central office. In other words, if the 10,000 units meter hand is on numeral five, then the tone found on the first contact of the rotary stepping switch will be the tone previously set up for numeral five. The process of pulsing is repeated through four or five contacts on the stepping switch as required by the type of meter being read. Each time one of the dials is connected into the system, the tone corresponding to the number position will be audible to the attendant at the utility company, thus assuring him the equipment is working.

The tone will pass from the meter 60 back to one of contacts 70 of the rotary switch 52, through the switch wiper 72 and into the telephone line, back to the utility company to the tone converter 22, where the frequency is converted to binary logic and sent to the computer 20 for recording, memory storage, billing, or the like.

The meter reading procedure, set forth above, requires only a few seconds to execute and as stated above, may be actually carried on by automatic dialing equipment. The step of conversing with the customer may be omitted by superimposing the start tone onto the originating trunk line as soon as the dialing begins, so that it will be present and detected the instant the subscriber line or connector terminal is seized, and will operate the start relay giving off-hook supervision without ringing the customer's telephone.

After the reading is completed, the attendant need only release the originating equipment by replacing his receiver on the hook, or this may be done by disconnecting the automatic dialing equipment from the circuit. The thermal timing contactor 56 at the subscriber's end will heat up sufficiently in about 30 seconds to open the locking path to the switching relay 48. When relay 48 opens, contact 6 is moved back into engagement with contact 5, thus opening the holding path to relay 58. Relay 58 holds momentarily to supply battery power to release the pawl 80 of rotary switch 52, returning the rotary switch 52 to its normal position, then closes down the entire system until needed again.

It should be noted that one of the distinguishing features between the present system and most of the prior art systems is that the elements of the present system are used only when the reading is being carried out, which is approximately once a month. The rest of the time the elements are not in use, and therefore do not wear out as quickly and necessitate repair or replacement. Other systems rely heavily on devices which accumulate and store information as the utility service is being used and thus continually operate.

Figure 6:
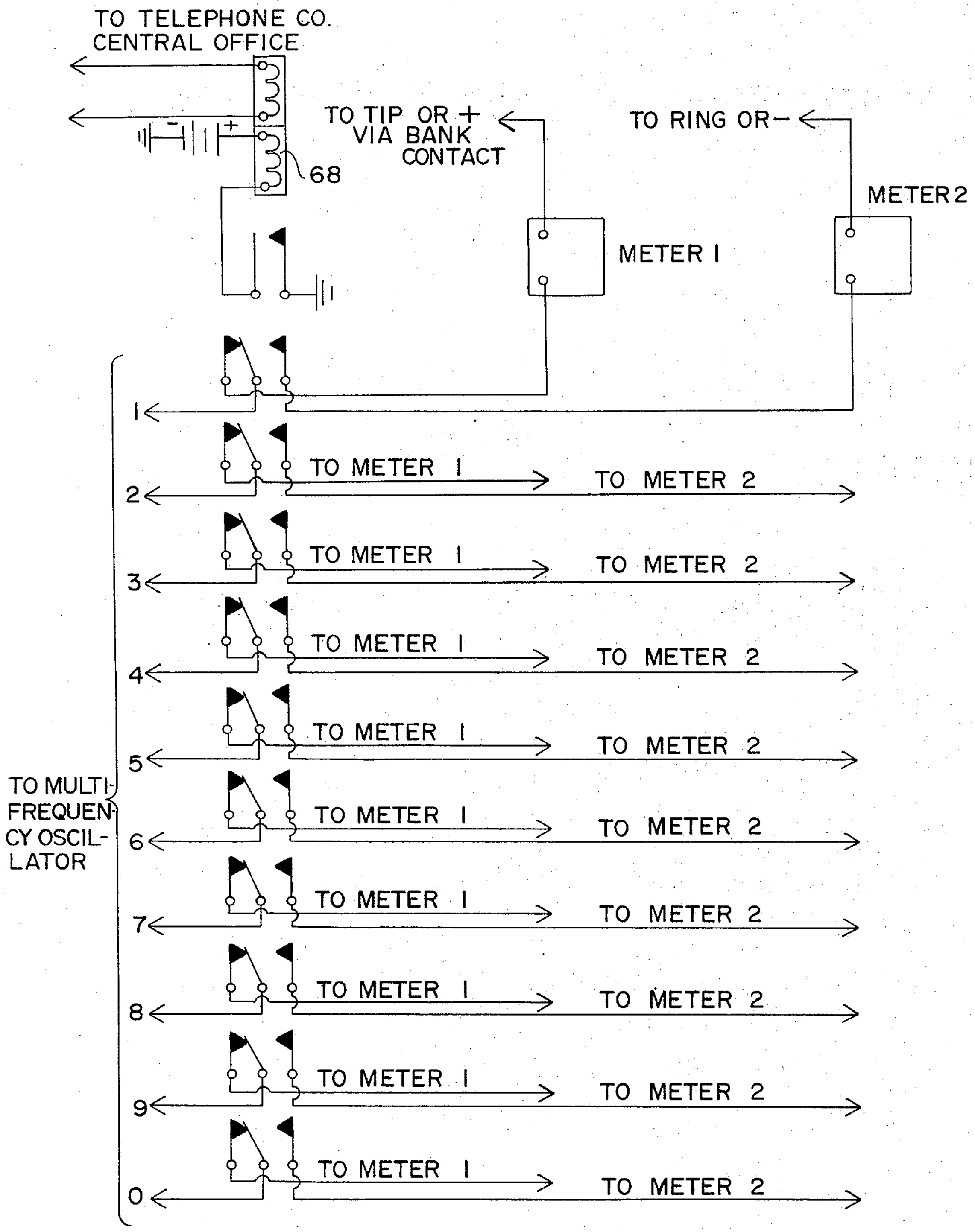
FIG. 6 is a partial schematic illustrating the manner in which the system of FIG. 1 can be adapted to monitor more than one type of meter at the remote location.

Referring now to FIG. 6 there is shown a transfer circuit which is an optional feature of the system if more than one utility meter is to be read at each location. For example, the same system might be used for reading the gas meter, the electric meter, and the water meter. The important feature of the transfer circuit is the addition of a transfer relay 68 into the ten conductive paths between the frequency generator 54 and the meters to be read. Initially and in the non-operative position, transfer relay 68 is connected to meter number one. If meter number two is to be read, a pulse at some pre-arranged frequency (for example 2,800 Hz.) is transmitted to the transfer relay 68. This pulse will operate the relay to shift to the second position, connecting the circuit to meter number two.

The system as described hereinabove meets all telephone company requirements and specifications as to balance and isolation from the telephone lines, meets underwriter laboratories safety specifications, and can be utilized by dialing the listed number without disturbing the customer. With the addition of the transfer relay 68, one unit can serve up to three different meters at a customer's location. With the use of inexpensive, multicontact, rotary stepping fantail switches, such as used in telephone switching centers, one unit may serve up to 910 meters of a single type in places as apartment houses, office buildings, and the like.

The system uses only standard telephone components which have been used through the years and with which existing telephone personnel are accustomed to use. The system does not depend on memory storage devices and multi-contact motor switches which must operate in perfect split second timing over varying line conditions of the telephone network. Therefore, there are no complicated counters, solenoids or storage devices.

The system may be used on private party, two-party or four-party lines, and is not affected by party line interference or voice frequencies on the line during the reading. The system is very inexpensive to manufacture and uses only low voltage DC power for operation, presenting no shock hazard to personnel, and requiring no special tooling to manufacture, since all parts are common to the phone manufacturing industry.

Although the system disclosed herein is considered to be a practical embodiment of the invention, it is understood that various changes may be made without departing from the spirit of the invention as defined in the claims.

What is claimed is:

1. Apparatus for reading a utility meter at a remote location from a central station over a telephone line comprising:

a. a first tone generating means for selectively generating at the central station a plurality of audio frequency tones including start and read tones, and impressing the tones onto said telephone line;

b. means for selectively connecting said central station with a prescribed customer utility meter at the other end of said telephone line and bypassing said telephone set in response to a first tone from said first tone generating means;

c. a meter reading network associated with each customer's utility meter and electrically connected into said telephone line at said customer's location and including:

i. a second tone generating means for electrically imparting to the dials of said meter a distinctive frequency tone for each number position of the dials, said second tone generating means including a plurality of fixed frequency oscillators, each oscillator generating a different frequency tone and connected with a contact point corresponding to one of the number positions on each of the dials;

ii. tone pickup means on each dial for connecting a frequency tone from the number position corresponding to the setting of the dial to the output of the meter;

iii. stepping switch means, the number of steps in said switch at least equal to the number of dials on said meter, each step connected to the output from one of said dials, whereby as each step is successively connected, the reading from the corresponding dial is transmitted;

iv. a starting circuit means responsive to selected start tones from said central station for activating said second tone generating means, and including means for automatically opening said starting circuit means after a predetermined time period of operation thereby disconnecting said starting circuit means from said central station;

v. first filter means operatively interconnected between said starting circuit means and said central station for only transmitting a predetermined start tone or tones from said central station to said starting circuit means whereby said starting circuit means can only be actuated by generating the proper frequency or frequencies at said central station;

vi. a pulsing circuit means responsive to at least one read tone for activating said stepping switch means, said pulsing circuit including means responsive to said read tone to move said stepping switch one step, said read tone being repeated to sequentially monitor each dial;

vii. second filter means operatively interconnected between said pulsing circuit means and said central station for only transmitting a predetermined read tone or tones from said central station to said pulsing circuit means, whereby said pulsing circuit can only be actuated by generating the proper frequency or frequencies at said central station;

viii. means interconnected between the dials of said customer's utility meter and said central station for transmitting the particular frequency from said second tone generating means that corresponds to the particular reading of a respective meter dial; and d. means at said central station for converting said frequency tones from said utility meter into computer language.

2. The apparatus according to claim 1, wherein the dial face of said meter comprises a non-conductive material having an electrically conductive segment molded into the surface thereof adjacent each of the number positions of each dial forming said contact points, said segments arranged in a circular pattern corresponding to the arrangement of the number positions, means for attaching each conductive segment to one of said fixed frequency oscillators, a continuous ring of electrically conductive material, concentric to the circular pattern formed by the number positions of each dial, molded into the face of each dial, means for connecting each ring with one of the contacts of said stepping switch means, and a wiper arm on each dial connected to the gearing mechanism of the meter to continuously revolve as the utility service is consumed, said arm being formed of a conductive material and having a pair of depending contacts extending therefrom, one of said contacts adapted for engagement with one of said conductive segments at all times and the other contact engaging said ring, whereupon said frequency tone is transmitted from one of said contacts to said conductive ring and back to the stepping switch.

3. The apparatus according to claim 2, wherein said step switch means comprises a rotary step switch including a plurality of contacts arranged in an arcuate path around a central shaft, a rotary wiper having one end connected to said shaft and the other end adapted to engage one of said contacts, a gear means mounted on said shaft and secured to said wiper for moving said wiper sequentially from one contact to another in response to a signal from said pulsing circuit, said gear means being spring-biased to a normal position out of engagement with any of said contacts, locking means in engagement with the teeth of said gear for preventing inadvertent return of said gear to said normal position during operation of said switch, and a release means for releasing said locking means from engagement with said gear upon completion of the meter reading operation to return said gear to said normal position.

4. The apparatus according to claim 1, and further including a transfer circuit comprising a transfer relay connected into the conductor path between said second tone generating means and said utility meter, said transfer relay being responsive to a third signal from said first tone generating means whereupon said relay, in a first position, connects said second tone generating means with said meter, and in a second position connects said tone generating means with a second meter, whereupon said apparatus may be used to read more than one type of meter.

* * * * *